United States Patent
Matsuoka

(10) Patent No.: US 7,017,362 B2
(45) Date of Patent: Mar. 28, 2006

(54) CONNECTION STRUCTURE OF COOLANT PIPE OF AIR CONDITIONER

(75) Inventor: Hiromune Matsuoka, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 28 days.

(21) Appl. No.: 10/506,633

(22) PCT Filed: Mar. 10, 2003

(86) PCT No.: PCT/JP03/02815

§ 371 (c)(1),
(2), (4) Date: Sep. 3, 2004

(87) PCT Pub. No.: WO03/078901

PCT Pub. Date: Sep. 25, 2003

(65) Prior Publication Data

US 2005/0120732 A1 Jun. 9, 2005

(30) Foreign Application Priority Data

Mar. 18, 2002 (JP) .............................. 2002-074380

(51) Int. Cl.
*F25D 19/00* (2006.01)
*H01B 7/00* (2006.01)
(52) U.S. Cl. ........................................................ 62/298
(58) Field of Classification Search ................ 62/298; 138/24, 30, 47, 103, DIG. 4
See application file for complete search history.

(56) References Cited

U.S. PATENT DOCUMENTS

| 5,611,680 A | * | 3/1997 | Small et al. ................ 417/422 |
| 5,622,058 A | * | 4/1997 | Ramakrishnan et al. ...... 62/295 |
| 5,732,565 A | * | 3/1998 | Ramakrishnan et al. ...... 62/298 |

FOREIGN PATENT DOCUMENTS

| JP | 51-128024 U | 10/1976 |
| JP | 4-136 A | 1/1992 |
| JP | 7-65783 A | 3/1995 |
| JP | 10-54498 A | 2/1998 |
| JP | 2000-329273 A | 11/2000 |

\* cited by examiner

*Primary Examiner*—Melvin Jones
(74) *Attorney, Agent, or Firm*—Shinjyu Global IP Counselors

(57) ABSTRACT

In an air conditioner which is divided into an indoor unit and an outdoor unit, the present invention improves the reliability with respect to the electrical insulation and refrigerant leakage of connection structures for refrigerant lines of the air conditioner that serve to transmit electrical signals of the indoor unit and outdoor unit via connection lines that serve to connect the indoor unit and outdoor unit and circulate refrigerant. An insulation portion of an electric insulation device is formed from an annular first flange, an annular second flange, a gasket that is arranged between the first flange and the second flange and composed of an electric insulation material, a plurality of through bolts and nuts that join the first flange and the second flange, a sleeve composed of an electric insulation material that lies between the bolt holes of the first flange and the second flange and the through bolts, and a washer that is interposed between head portions of the through bolts and the first flange.

4 Claims, 2 Drawing Sheets

CONNECTION STRUCTURE OF COOLANT PIPE OF AIR CONDITIONER

TECHNICAL FIELD

The present invention relates to a refrigerant line connection structure for an air conditioner, and more particularly to a refrigerant line connection structure for an air conditioner divided into an indoor unit and an outdoor unit, and which serves to transmit electric signals of the indoor unit and outdoor unit via connecting lines which serve to connect the refrigerant lines of the indoor unit with the refrigerant lines of the outdoor unit and circulate refrigerant.

BACKGROUND ART

In an air conditioner which is divided into an indoor unit and an outdoor unit, the connection between the indoor unit and the outdoor unit is generally performed by means of a gas side connection line and a liquid side connection line which serve to connect the indoor unit refrigerant lines and the outdoor unit refrigerant lines, and by means of electric connection lines that serve to transmit electric signals between the indoor unit refrigerant lines and the outdoor unit refrigerant lines.

With this type of air conditioner, time and effort will be needed in order to perform the installation thereof, because one will need to connect each connection line to the indoor unit refrigerant lines and the outdoor unit refrigerant lines, and connect the electric connection lines. Because of this, it is desirable to improve the work efficiency of the installation.

A configuration in which the gas side connection lines and the liquid side connection lines are used as the electric connection lines is disclosed in Japanese Unexamined Patent Publication H07-65783 as a means of solving the aforementioned problem. Specifically, by providing an electric insulation device in the connection portions between the gas side connection lines and the liquid side connection lines and the indoor unit refrigerant lines and the outdoor unit refrigerant lines, the gas side connection lines and the liquid side connection lines between the refrigerant lines of the indoor unit and the refrigerant lines of the outdoor unit are electrically insulated and used as electric connection lines.

However, there is a need for a high degree of reliability with respect to the electric insulation and refrigerant leakage of the refrigerant line connection structure described above. In addition, because the refrigerant lines on the indoor unit side and the outdoor unit side function as a ground for the compressor, the magnetic valves, and the like that form the air conditioner, then from this perspective as well, there is a need for reliable electrical insulation in the connection portions between the indoor unit side and the outdoor unit side refrigerant lines and the connection lines.

SUMMARY OF THE INVENTION

In an air conditioner which is divided into an indoor unit and an outdoor unit, an object of the present invention is to improve the reliability with respect to the electrical insulation and refrigerant leakage of connection structures for refrigerant lines of the air conditioner that serve to transmit electrical signals of the indoor unit and outdoor unit via connection lines that serve to connect the indoor unit and outdoor unit and circulate refrigerant.

According to a first aspect of the present invention, the connection structure of a refrigerant line of an air conditioner divided into an indoor unit and an outdoor unit serves to transmit electric signals of the indoor unit and the outdoor unit via connection lines that serve to connect refrigerant lines of the indoor unit and refrigerant lines of the outdoor unit and circulate refrigerant, the connection structure including a first flange, a second flange, a first insulation material, a plurality of bolts, and a second insulation material. The first flange is arranged on an end portion of the connection line side of the refrigerant lines of the indoor unit and an end portion of the connection line side of the refrigerant lines of the outdoor unit. The second flange is arranged on the connection lines to correspond to the first flange. The first insulation material is composed of an electric insulation material that is interposed between the first flange and the second flange. The plurality of bolts join the first flange and the second flange. The second insulation material is composed of an electric insulation material that lies between the plurality of bolts and at least one of the first flange and the second flange.

In this connection structure of a refrigerant line, reliability can be improved with respect to electric insulation and refrigerant leakage, because the first flange and the second flange are electrically insulated via the first insulation material, and a plurality of bolts that are electrically insulated by the second insulation material are employed and a flange structure is employed in which the first flange and the second flange are joined together.

According to a second aspect of the present invention, the connection structure of a refrigerant line of an air conditioner of the first aspect of the present invention is provided, in which the end portion of the plurality of bolts are covered by a coating material that is composed of an electric insulation material.

Normally, with the refrigerant lines and connection lines of the indoor unit and the outdoor unit, condensation will form on the surface of the lines due to the difference in temperature between the exterior and interior of each line. Because of this, even if the electrical insulation is satisfactory when there is no condensation, when there is condensation, electricity may be transmitted between the refrigerant lines and the connection lines of the indoor unit and the outdoor unit via the condensed water.

With the connection structure of the refrigerant lines, even when condensation is produced on the head portions of the bolts, no electricity will be transmitted between the first flange or the second flange and the head portions of the bolts, via the condensed water, because the end portion of the plurality of bolts are covered by a coating material. This allows the reliability with respect to electric insulation to be further improved.

According to a third aspect of the present invention, the connection structure of a refrigerant line of an air conditioner of the first or second aspect of the present invention is provided, in which the first flange, the second flange, and the plurality of bolts are covered with a thermal insulation material.

With the connection structure of the refrigerant lines, the production of condensation on the surfaces of each line can be controlled because the first flange, the second flange, and the plurality of bolts are covered by a thermal insulation material. This allows the reliability with respect to electric insulation to be further improved.

PREFERRED EMBODIMENTS OF THE INVENTION

A first embodiment of the present invention will be described below with reference to the figures.

Figure 1:
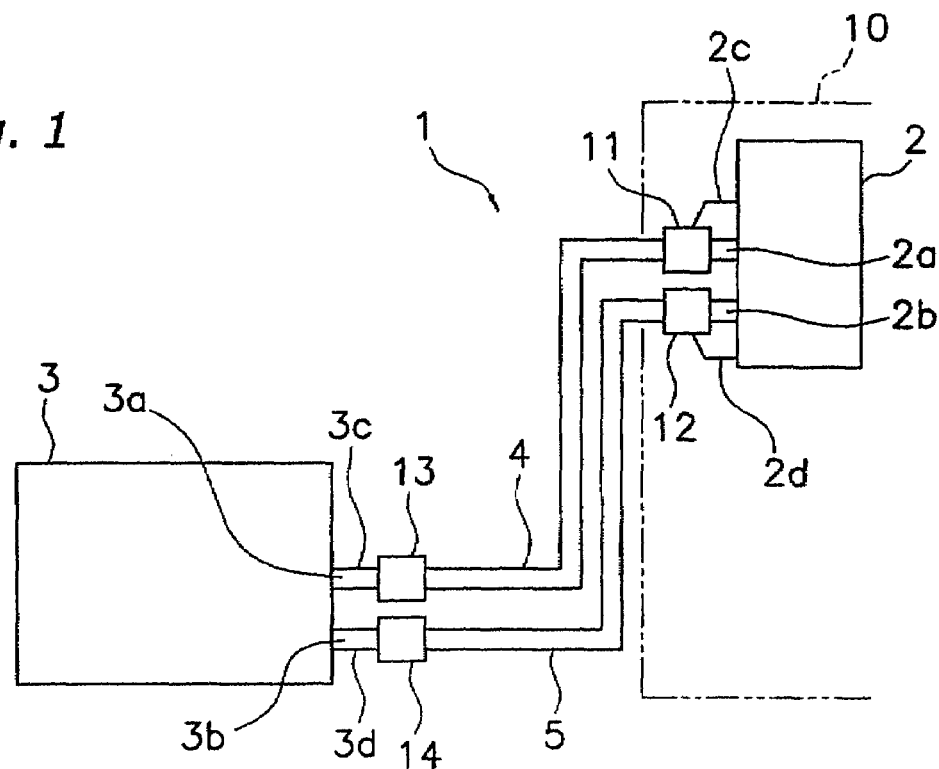
FIG. 1 is a structural view of an air conditioner according to an embodiment of the present invention.

(1) Configuration of Air Conditioner and Connection Structure of Refrigerant Lines FIG. 1 shows the configuration of an air conditioner 1 of an embodiment. As shown in FIG. 1, the air conditioner 1 includes an indoor unit 2 that is installed on the inner side of an outer wall 10 of a building, an outdoor unit 3 that is installed on the outer side of the outer wall 10, a gas side connection line 4 (connection line), a liquid side connection line 5 (connection line), electric insulation devices 11, 12 which are respectively provided between the gas side connection line 4 and a gas side refrigerant line 2a on the indoor unit 2 side and between the liquid side connection line 5 and a liquid side refrigerant line 2b on the indoor unit 2 side, electric insulation devices 13, 14 which are respectively provided between the gas side connection line 4 and a gas side refrigerant line 3a on the outdoor unit 3 side and between the liquid side connection line 5 and a liquid side refrigerant line 3b on the outdoor unit 3 side, electric connection lines 2c, 2d that are respectively connected from the indoor unit 2 to the electric insulation devices 11, 12, and electric connection lines 3c, 3d that are respectively connected from the outdoor unit 3 to the electric insulation devices 13, 14.

The gas side connection line 4 and the liquid side connection line 5 are, for example, made from a metal such as copper or the like, and serve to connect the refrigerant lines of the indoor unit 2 and the refrigerant lines of the outdoor unit 3 and allow refrigerant to circulate. The refrigerant lines 2a, 2b on the indoor unit 2 side and the refrigerant lines 3a, 3b on the outdoor unit 3 side are, for example, made of a metal such as copper or the like, and are connected to equipment installed inside the indoor unit 2 and the outdoor unit 3.

The electric insulation device 11 is arranged between the gas side connection line 4 and the gas side refrigerant line 2a of the indoor unit 2, and electrically insulates the gas side connection line 4 and the gas side refrigerant line 2a on the indoor unit 2 side. The electric insulation device 12 is arranged between the liquid side connection line 5 and the liquid side refrigerant line 2b of the indoor unit 2, and electrically insulates the liquid side connection line 5 and the liquid side refrigerant line 2b on the indoor unit 2 side. The electric insulation device 13 is arranged between the gas side connection line 4 and the gas side refrigerant line 3a of the outdoor unit 3, and electrically insulates the gas side connection line 4 and the gas side refrigerant line 3a on the outdoor unit 3 side. The electric insulation device 14 is arranged between the liquid side connection line 5 and the liquid side refrigerant line 3b of the outdoor unit 3, and electrically insulates the liquid side connection line 5 and the liquid side refrigerant line 3b on the outdoor unit 3 side. In other words, the gas side connection line 4 and the liquid side connection line 5 between the indoor unit 2 and the outdoor unit 3 are electrically insulated from the refrigerant lines 2a, 2b, 3a, 3b on the indoor unit 2 and the outdoor unit 3 sides by means of the electric insulation devices 11–14.

The electric insulation lines 2c, 2d, 3c, 3d are conductors which serve to transmit electric signals such as control signals and the like between the indoor unit 2 and the outdoor unit 3, and are respectively electrically connected to the gas side connection line 4 and the liquid side connection line 5 via the electric insulation devices 11, 12, 13, 14. In other words, the gas side connection line 4 functions as an electric line in order to connect the electric connection lines 2c and 3c, and the liquid side connection line 5 functions as an electric line in order to connect the electric connection lines 2d and 3d.

Next, the structure of the electric insulation device 11 will be described. Note that although the connection positions of the other electric insulation devices 12, 13, 14 with each line are different, a description of the other electric insulation devices 12, 13, 14 will be omitted because they have the same structure as that of the electric insulation device 11.

Figure 2:
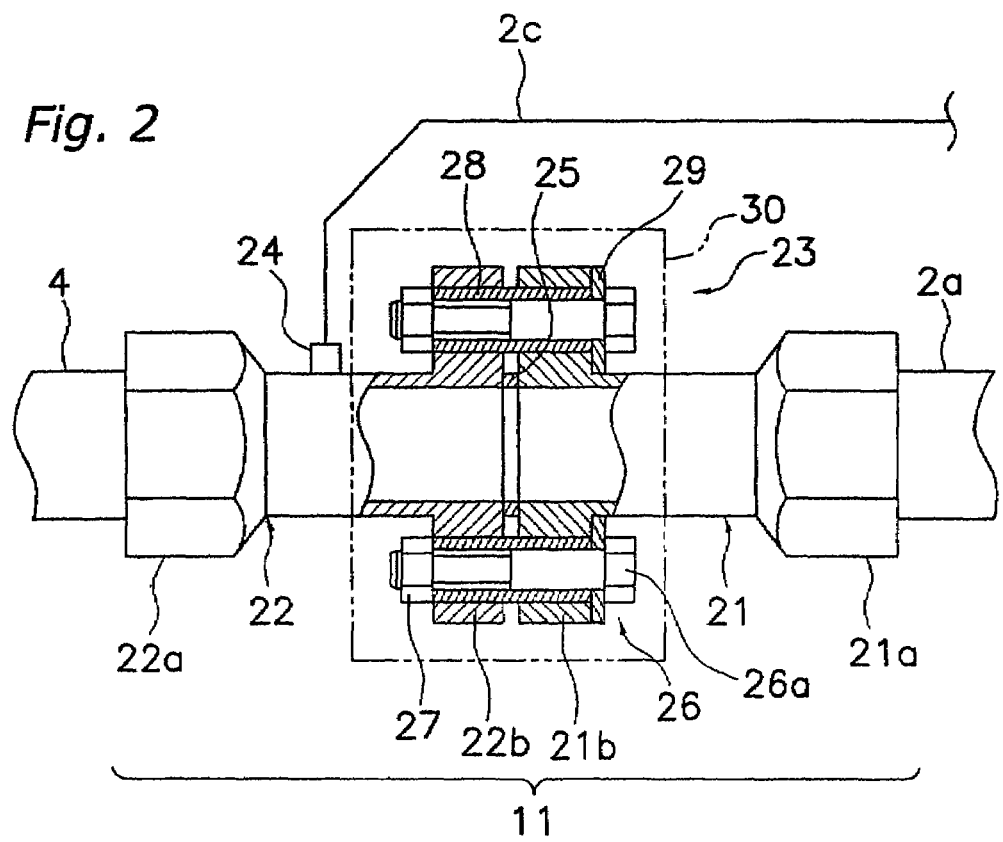
FIG. 2 shows an electric insulation device of a first embodiment.

As shown in FIG. 2, the electric insulation device 11, includes a refrigerant line connection portion 21 that is connected to the gas side refrigerant line 2a of the indoor unit 2, a connection line connection portion 22 that is connected to the gas side connection line 4, an insulation portion 23 capable of both electrically insulating the refrigerant line connection portion 21 and the gas side connection line 4 and circulating refrigerant, and a terminal portion 24 on which the electric connection line 2c is mounted.

The refrigerant line connection portion 21 is, for example, made of a metal such as copper or the like, and is connected to the gas side refrigerant line 2a of the indoor unit 2 by means of a flare nut 21a that is arranged on the refrigerant line 2a side of the indoor unit 2 side. The connection line connection portion 22 is connected to the gas side connection line 4 by means of a flare nut 22a that is arranged on the gas side connection line 4 side. Thus, the refrigerant line connection portion 21 forms an end portion of the gas side connection line 4 side of the gas side refrigerant line 2a, and the connection line connection portion 22 forms an end portion of the gas side refrigerant line 2a side of the gas side connection line 4.

The insulation portion 23 is formed from an annular first flange 21b that is formed on the end portion of the gas side connection line 4 side of the refrigerant line connection portion 21, an annular second flange 22b that is formed on the end portion of the indoor unit 2 side of the connection line connection portion 22, a gasket 25 (a first insulation material) that is arranged between the first flange 21b and the second flange 22b, a plurality of through bolts 26 and nuts 27 that serve to join the first flange 21b and the second flange 22b, a sleeve 28 (a second insulation material) that lies between the through bolts 26 and the bolt holes of the first flange 21b and the second flange 22b, and a washer 29 (a second insulation material) that is interposed between head portions (end portions) 26a of the through bolts 26 and the first flange 21b. In addition, the head portions 26a of the through bolts 26 are covered by a coating material composed of an electric insulation material such as ceramic, resin, or the like. Here, the first flange 21b, the second flange 22b, and the plurality of through bolts 26 and the nuts 27 are made of a metal. The gasket 25 is an annular member that is composed of an electric insulation material such as rubber, resin, or the like. The sleeve 28 is a cylindrical member that is composed of an electric insulation material such as a resin. Furthermore, the insulation portion 23 is covered by a thermal insulation material 30.

The insulation portion 23 described above allows the refrigerant line connection portion 21 and the connection line connection portion 22 to be electrically insulated, and allows refrigerant to circulate. Thus, the gas side refrigerant line 2a of the indoor unit 2 and the gas side connection line 4 are electrically insulated via the insulation portion 23. Then, electric signals can be transmitted via the gas side connection line 4 between the electric connection line 2c of the indoor unit 2 and the electric connection line 3c of the outdoor unit 3. In addition, electric signals can be transmitted via the liquid side connection line 5 between the electric connection line 2d of the indoor unit 2 and the electric connection line 3d of the outdoor unit 3.

(2) Special Characteristics of the Connection Structure of the Refrigerant Lines The special characteristics of the connection structure of the refrigerant lines of the air conditioner of the present embodiment are as follows:

① Employment of the Flange Structure

Reliability is improved with respect to refrigerant leakage, because a flange structure such as that of the insulation portion 23 of the electric insulation devices 11–14 is employed as a connection structure between the end portion (in the present embodiment, the refrigerant line connection portion 21) of the refrigerant lines 2a, 2b of the indoor unit 2 of the present embodiment and the end portion (in the present embodiment, the connection line connection portion 22) of the refrigerant lines 3a, 3b of the outdoor unit 3 of the present embodiment.

In addition, the plurality of bolts 26 that are used in joining the first flange 21b and the second flange 22b have improved reliability with respect to electric insulation because they are insulated from the first flange 21b by means of the sleeve 28 and the washer 29 composed of an electric insulation material.

② A Countermeasure to Refrigerant Line Condensation

With the connection structure of the refrigerant lines of the present embodiment, when condensation is produced near the electric insulation devices 11–14 while the air conditioner is operating, electricity will not be conducted between the refrigerant line connection portion 21 and the connection line connection portion 22 via condensed water, even if condensed water is produced on the head portions 26a of the plurality of bolts 26, because the head portions 26a of the bolts 26 are covered with a coating material.

In addition, condensation on the electric insulation devices 11–14 can be suppressed because the first flange 21b, the second flange 22b, and the plurality of bolts 26 are covered by a thermal insulation material 30.

[Second Embodiment]

Figure 3:
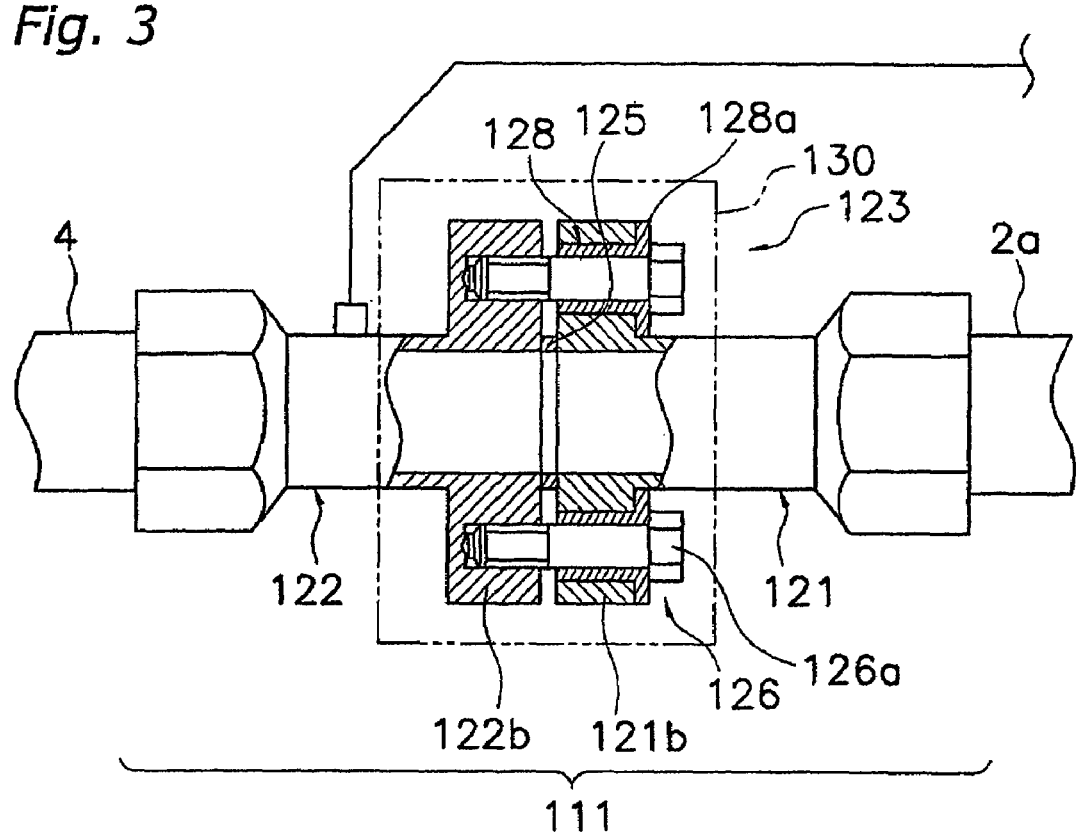
FIG. 3 shows an electric insulation device of a second embodiment.

The present embodiment has the same basic structure as that of the first embodiment, and only the structure of the insulation portion of the electric insulation device is different. An insulation portion 123 of the present embodiment will be described below with reference to FIG. 3. Note that here, an electric insulation device 111 that corresponds to the electric insulation device 11 of the first embodiment will be described, and a description of other electric insulation devices 112, 113, 114 will be omitted.

The insulation portion 123 of the electric insulation device 111 includes is formed from an annular first flange 121b that is formed on the end portion of the gas side connection line 4 side of a refrigerant line connection portion 121, an annular second flange 122b that is formed on the end portion of the indoor unit 2 side of the connection line connection portion 122, a gasket 125 (a first insulation material) that is arranged between the first flange 121b and the second flange 122b, a plurality of push bolts 126 that serve to join the first flange 121b and the second flange 122b, and a sleeve 128 (a second insulation material) that lies between the bolt holes of the first flange 121b and the push bolts 126. The sleeve 128 includes a washer portion 128a that is interposed between head portions 126a (end portions) of the push bolts 126 and the first flange 121b. In addition, the head portions 126a of the push bolts 126 are covered by a coating material composed of an electric insulation material such as a ceramic, a resin, or the like. Here, the first flange 121b, the second flange 122b, and the plurality of push bolts 126 are made of a metal. The gasket 125 is an annular member that is composed of an electric insulation material such as rubber, resin, or the like. The sleeve 128 is a cylindrical member that is composed of an electric insulation material such as resin. Then, the insulation portion 123 is covered by a thermal insulation material 130.

In the present embodiment, the same effects as those of the first embodiment can be obtained.

OTHER EMBODIMENTS

Although embodiments of the present invention were described above based upon the figures, the specific configuration of the present invention is not limited to the aforementioned embodiments, and can be modified within a range that does not depart from the essence of the invention.

For example, in the first and second embodiments, the first flange and the second flange are arranged on the refrigerant lines and the connection lines via the refrigerant line connection portion and the connection line connection portion that form the electric insulation device, but may instead be directly arranged on the refrigerant lines and the connection lines.

In addition, in the first embodiment, the washer is installed on the head portion side of the through bolt, but may instead be installed on the nut side.

Furthermore, in the first and second embodiments, the electric insulation device is disposed on the exterior of the indoor unit and the outdoor unit, but may instead be built into the interior of the indoor unit and the outdoor unit.

INDUSTRIAL APPLICABILITY

If the present invention is used, reliability with respect to electric insulation and refrigerant leakage can be improved because a flange structure is employed and electric insulation is performed between the connection lines and the refrigerant lines of the indoor unit and the refrigerant lines of the outdoor unit.

What is claimed is:

1. A connection structure of a refrigerant line of an air conditioner divided into an indoor unit and an outdoor unit that serves to transmit electric signals of the indoor unit and the outdoor unit via a connection line that serves to connect a refrigerant line of the indoor unit and a refrigerant line of the outdoor unit and circulate refrigerant, the connection structure comprising:

a first flange arranged on an end portion of the connection line side of the refrigerant line of the indoor unit and an end portion of the connection line side of the refrigerant line of the outdoor unit;

a second flange arranged on the connection lines to correspond to the first flange;

a first insulation material composed of an electric insulation material that is interposed between the first flange and the second flange;

a plurality of bolts that serve to join the first flange and the second flange; and a second insulation material that is composed of an electric insulation material that lies between the plurality of bolts and at least one of the first flange and the second flange.

2. The connection structure of a refrigerant line of an air conditioner set forth in claim 1, wherein an end portion of the plurality of bolts is covered by a coating material that is composed of an electric insulation material.

3. The connection structure of a refrigerant line of an air conditioner set forth in claim 1, wherein the first flange, the second flange, and the plurality of bolts are covered with a thermal insulation material.

4. The connection structure of a refrigerant line of an air conditioner set forth in claim 2, wherein the first flange, the second flange, and the plurality of bolts are covered with a thermal insulation material.

* * * * *